US012661623B2

(12) United States Patent
Pereira

(10) Patent No.: US 12,661,623 B2
(45) Date of Patent: Jun. 23, 2026

(54) COMPUTER-IMPLEMENTED METHOD, COMPUTER-BASED PRODUCT, AND MONITORING SYSTEM FOR CONTACTLESS ASSESSMENT OF RHEOLOGICAL PROPERTIES OF FLUID CEMENT-BASED PRODUCTS

(71) Applicant: Juan Manuel Pereira, Moralzarzal (ES)

(72) Inventor: Juan Manuel Pereira, Moralzarzal (ES)

( * ) Notice: Subject to any disclaimer, the term of this patent is extended or adjusted under 35 U.S.C. 154(b) by 669 days.

(21) Appl. No.: 18/172,472

(22) Filed: Feb. 22, 2023

(65) Prior Publication Data

US 2023/0264156 A1 Aug. 24, 2023

(30) Foreign Application Priority Data

Feb. 24, 2022 (ES) ................................ ES202230151

(51) Int. Cl.
*B01F 35/21* (2022.01)
*B01F 35/212* (2022.01)
(Continued)

(52) U.S. Cl.
CPC ........ *B01F 35/213* (2022.01); *B01F 35/2111* (2022.01); *B01F 35/212* (2022.01);
(Continued)

(58) Field of Classification Search
CPC .. B01F 35/213; B01F 35/2111; B01F 35/212; B01F 35/2134; B01F 35/2136;
(Continued)

(56) References Cited

U.S. PATENT DOCUMENTS

2005/0174879 A1 8/2005 Bentley et al.
2017/0361492 A1 12/2017 Datema et al.

FOREIGN PATENT DOCUMENTS

JP 2005069717 A * 3/2005

OTHER PUBLICATIONS

Sarno et al., "Challenges and improvements in applying a particle image velocimetry (PIV) approach to granular lows", IOP Conf. Series: Journal of Physics: Conf. Series 1249, 2019, 012011, pp. 1-14.

(Continued)

*Primary Examiner* — Robert R Raevis
(74) *Attorney, Agent, or Firm* — LUCAS & MERCANTI, LLP

(57) ABSTRACT

A computer-implemented method and a computer-based product and monitoring system for contactless assessment of rheological properties of a fluid cement-based product, the method performing a first analysis which obtains the rotation speed of the mixing blades (31) of a truck-mounted concrete mixer drum (30) and detects the variation of the speed constituting a first parameter, performing a second analysis which obtains at least a sequence of images of the fluid product contained within the mixer drum (30), identifies particles, shapes, groups of particles, contours, and/or slope of the fluid product within the collection of sequential images, detects variations of speed and displacement direction of the particles and shapes, constituting a second parameter, performing a third analysis that detects a correlation between each first and second parameters from which the system calculates at least one parameter of rheological properties of the fluid product.

20 Claims, 3 Drawing Sheets

(51) Int. Cl.
*B01F 35/213* (2022.01)
*B01F 35/214* (2022.01)
*B01F 101/28* (2022.01)

(52) U.S. Cl.
CPC ...... *B01F 35/2134* (2022.01); *B01F 35/2136* (2022.01); *B01F 35/214* (2022.01); *B01F 2101/28* (2022.01)

(58) Field of Classification Search
CPC ................ B01F 35/214; B01F 2101/28; B01F 2215/0495; B28C 7/024; B28C 7/026; B28C 5/422; G06Q 50/08
USPC ........... 73/54.01, 54.03, 54.23, 54.28, 54.29; 348/61, 86; 340/603; 702/22, 23, 25, 50
See application file for complete search history.

(56) References Cited

OTHER PUBLICATIONS

"Particle image velocimetry", Wikipedia, 2022, retrieved from https://en.wikipedia.org/w/index.php?title=Particle_image_velocimetry&oldid=1070062673, pp. 1-14.

* cited by examiner

COMPUTER-IMPLEMENTED METHOD, COMPUTER-BASED PRODUCT, AND MONITORING SYSTEM FOR CONTACTLESS ASSESSMENT OF RHEOLOGICAL PROPERTIES OF FLUID CEMENT-BASED PRODUCTS

CROSS-REFERENCE TO RELATED APPLICATION

This application claims priority of Spanish Patent Application No. P 202230151, filed Feb. 24, 2022, the contents of which is incorporated herein by reference.

TECHNICAL FIELD

The present disclosure relates to a computer-implemented method, a computer-based product and a monitoring system for contactless assessment of rheological properties of a fluid cement-based product.

The fluid product is a cement-based material, i.e. a mixture containing cement before it sets and hardens, generally concrete mixtures of any type (standard, self-compacting, white or colored, with accelerated or retarded setting, etc.) which also includes mortars, low-strength filling materials, micro-concretes, shotcrete, etc.

It's understood that all references to "cement", "cement-based material", and similar expressions refer not only to products strictly based on hydraulic cement, typically Ordinary Portland Cement or "OPC", but also include any other binder material (e.g. blended cements, geopolymers, alternative binders, limestone calcinated clay cement "LC3", etc.) and their derived products, existing or to exist in the future, utilized in the construction and casting of structural or non-structural elements, in combination with and/or substituting traditional materials such as hydraulic cement concrete, mortar, etc., which are transported, from a central batching facility to the construction sites or molds, inside mixer trucks commonly referred to as "concrete mixer trucks". For the sake of simplicity, the present disclosure employs the wording "cement", "cement-based materials", and similar expressions to refer to the whole range of aforementioned products and materials, which can be analyzed by the disclosed invention.

The rheological properties are those which, inherent to materials capable of flowing, determine the relationship between a force applied to said materials and the deformation or flow they experience in response to that stress.

Rheological properties may include, among others, the fluidity, plasticity, viscosity, and/or viscoelasticity of a fluid material. The rheological properties may include other metrics such as, but not limited to, slump value, obtained through an "Abrams Cone" test (as described in ASTM C-143) for fluid concrete and other cement-based products, commonly employed to assess workability and suitability for placement, which is one of the rheological properties of the fluid product.

BACKGROUND OF THE INVENTION

One established practice in the concrete and cement-based products industry is the visual inspection and evaluation of rheological parameters of the fluid cement-based product during the mixing inside a mixer drum, typically within a truck-mounted rotating drum, this evaluation being entirely based on the experience and perception of the operator. The operator, usually the truck driver, proceeds then to addition different additives that modify the rheological properties of the fluid cement-based mixture, such as water and/or admixtures, to modify the rheological properties of the fluid product such that it becomes acceptable for its pour on site.

Evidently, this practice is scantly trustworthy and does not conduct to objective and repeatable evaluations.

Furthermore, depending on which stage of the process the rheological modifying additives are incorporated into the fluid material, this common practice encourages abuse by the involved personnel, especially for truck drivers and on-site personnel involved in pouring and casting the cement-based product, who seldomly have any responsibility over the composition of the mixture, nor over the performance characteristics of the end product, and don't keep records of such additions. This is especially commonplace whenever the fluid product is transported with mixer trucks, featuring a rotating drum with mixing blades in its interior, and the truck driver intervenes in the composition of the fluid product during transport by manually adding the aforementioned additives.

In numerous occasions where the transport time and/or the discharge time are considerable, and/or the ambient temperature is high, and/or high early strength cements are used, among others, the rheology of the fluid cement-based material can substantially change from the moment of initial mixture at a central batching facility to the moment of its pour on site. Whenever the mixer trucks feature an automatic water and/or admixtures dosing system that allows the adjustment of rheological parameters during transport and discharge, these are used on-demand at a certain moment, or by "dripping" (i.e. a small and continuous dosage of an additive over an extended period of time) to counteract the naturally-occurring rheology changes.

The addition of water and/or admixtures by dripping is, generally speaking, an indiscriminate intervention by which the dripping rate is adjusted in anticipation of an estimated workability loss induced by one or more of the aforementioned causes, therefore it produces excess or defect of workability in numerous occasions. The disclosed invention improves on these common practices by providing an objective, constant, and real-time measurement of the rheological properties of the material, allowing for timely and proportionate interventions according to changes detected in the rheology.

It's also commonplace to perform empirical tests of the fluid product at plant and/or once the truck arrives on site, typically the Abrams Cone test, among others. In the case of detecting non-conforming rheological properties precious time is needed for the addition of water and/or admixtures and to properly mix them into the whole volume of the product inside the mixing drum to produce a homogeneous mixture; this time is added to the total transport time and becomes excessive in occasions.

The disclosed invention solves all the aforementioned issues and others that are commonplace in the industrial practices.

DESCRIPTION OF THE INVENTION

The present disclosure, in one embodiment, proposes a computer-implemented method for contactless assessment of rheological properties of fluid products.

The fluid product can be any material with the capacity of flowing, with higher or lower viscosity, preferably a cement-based product which contains at least one mixture of cement, water, and aggregates in known proportions, before its setting.

The proposed computer-implemented method comprises:

obtaining first data related to a displacement speed of a set of mixing blades contained in a mixer drum during at least one period of time;

obtaining at least one image sequence of a fluid product contained within the mixer drum during the at least one period of time;

determining a first parameter, in a first analysis, related to a variation of the displacement speed of the set of mixing blades, for example by implementing, in a computer processing unit, a first algorithm that:

analyzes the first data, detecting variations in the displacement speed of the mixing blades constitutive of the first parameter;

determining a second parameters, in a second analysis, related to a variation of a local displacement direction and speed of a surface of a fluid product contained in the mixer drum by implementing, in a computer processing unit, a second algorithm that:

analyzes the at least one image sequence identifying particles, shapes, groups of particles, contours, and/or slopes of the surface of the fluid product and a displacement direction and speed thereof during the at least one period of time, indicative of a local displacement direction and speed of the surface of the fluid product;

detects variation in the local displacement direction and speed of the surface of the fluid product obtained from the analysis of the at least one image sequence. constitutive of the second parameter;

calculating, in a third analysis, at least one rheological property parameter of the fluid product by implementing, in a computer processing unit, a third algorithm that:

detects a correlation between each first parameter and at least one of the subsequent second parameters; and calculates, based on the detected correlations, at least one of the rheological property parameters of the fluid product.

It is understood that the detection of the correlation is the detection, through comparison, of how the first parameter affects a second parameter, meaning how the variations of the displacement speed of the blades of the mixing drum affect the variation in the displacement speed and direction of the fluid product.

According to the aforementioned, the method proposes first to determine the displacement speed of the blades of the mixing drum, which mix the fluid product, and detect variations in said speed of displacement of the blades through a first algorithm.

The displacement speed of the blades is typically a rotation speed, which can be provided directly to the processor by an actuator on the blades, can be provided by a device, such a sensor, associated to said blades or to any element kinetically linked to said blades, or can be deduced by the first algorithm through the analysis of at least a sequence of images obtained from a device associated to the blades, such a camera oriented towards the blades.

The disclosed method proposes acquiring an image sequence of the fluid product, typically images of at least a part of the surface of the fluid product inside the mixing drum that is exposed and visible, and deliver said image sequence to the second algorithm.

Typically, the images sequence will be acquired by an imaging device, such as one or more video cameras, and/or infrared cameras, and/or at least one laser sensor for detection and location (i.e. a LIDAR). It's understood that the measurements of distances in three dimensions obtained by the laser detection and location sensor can be represented as a three-dimensional image, therefore such device is considered as an image acquisition device as well.

The second analysis, performed by the second algorithm, allows identifying and determining the displacement direction and speed of particles, shapes, groups of particles, contours, and/or slopes existing in the fluid product within said images sequence, and identifying variations during at least a period of time in the displacement direction and speed of particles, shapes, groups of particles, contours, and/or slopes.

The displacement of said particles, shapes, groups of particles, contours, and/or slopes through the surface of the fluid product is indicative of the local displacement direction and speed of the surface of the fluid product and enables knowing how the fluid product flows when the blades are mixing it, particularly immediately after a variation in the speed of the blades. This becomes especially relevant immediately after stopping said mixing by the blades, when the blades'speed is equal to zero.

The local displacement direction and speed of the surface of the fluid product is the displacement direction and speed on each region of the surface of the fluid product.

Any delay between the variation of the speed of the blades and the variation of the speed of the surface of the fluid product is indicative of the rheologic properties of the fluid product, such its density, viscosity, inertia, etc. Also, differences between the variation in the displacement direction and speed of different regions of the surface of the fluid product can provide information enabling the calculation of rheologic properties by the third algorithm.

Typically, this is achieved by visual recognition algorithms, as part of the second algorithm, that analyze the images contained in the sequence of images to identify the particles, shapes, groups of particles, contours, and/or slopes on said images and to track the displacement direction and speed of said detected elements. The second algorithm can also include other algorithms, different to the visual recognition algorithm, to analyze the data obtained from the visual recognition algorithm to determine variations in the local displacement direction and speed of the surface of the fluid product.

The third analysis detects the correlation existing between the variations in displacement speed of the mixing blades and the variations in displacement speed and direction of the particles, shapes, groups of particles, contours, and/or slopes. This correlation provides information regarding the rheological properties of the fluid product, from which the third algorithm can determine at least one rheological properties parameter of the fluid product.

In other words, by analyzing how the variation in displacement speed of the blades affect the displacement variation and speed of the particles, shapes, groups of particles, contours, and/or slopes of the fluid product, it allows for the determination of rheological parameters of said fluid product.

According to one preferred embodiment, the third algorithm, in order to calculate at least one rheological properties parameter of the fluid product, to perform said calculation it considers data matrixes that store and correlate the following data from the aforementioned exemplary embodiments:

variations in the displacement speed of the mixing blades;

variations in the displacement direction and/or speed of the particles, shapes, groups of particles, contours, and/or slopes;

at least one rheological properties parameter of each fluid product.

Said consideration made by the third algorithm of the aforementioned data matrixes can comprise, for example, accessing the data matrixes to locate the closest examples given the circumstances of the case at hand, obtaining at least one rheological properties parameter of said closest examples, or to interpolate at least one rheological properties parameter from the rheological properties parameters of the closest examples found.

Alternatively, said consideration can be performed though the training of the third algorithm, which is an automatic machine learning algorithm, an artificial intelligence algorithm, and/or a neural network algorithm, with the use of said data matrixes, allowing the trained third algorithm to calculate the rheological properties parameter without accessing in each case the data matrixes, which allows the extrapolation outside the data set provided for its training.

Another embodiment proposes that the third algorithm comprises, additionally, obtaining the composition and quantity of the fluid product to analyze, and that the data matrixes considered by said third algorithm store and correlate, additionally for each previous example, information regarding the composition and quantity of the fluid product.

This allows the third algorithm to preferentially consider the data contained in the data matrixes that refer to fluid products with an equal or similar composition and/or quantity to the composition and/or quantity of the fluid product to be analyzed, therefore being able to obtain at least one more precise rheological properties parameter.

According to yet another embodiment of the present invention, the third analysis can include the detection and measurement of a temporal gap existing between one starting moment of each first parameter and one starting moment of each respective second subsequent parameter and/or between one final moment of each first parameter and one final moment of each respective second subsequent parameter, and utilize said temporal gap in the calculation of the rheological properties parameter of the fluid product.

In other words, the elapsed time since the start of a variation in the displacement speed and/or direction of the blades inside the mixing drum until said variation causes a variation in the displacement direction and speed of the particles, shapes, groups of particles, contours, and/or slopes of the fluid product, provides relevant information that improves the precision of the determination of the rheological properties of the fluid product.

Likewise, the elapsed time since the moment a variation in the displacement speed of the mixing blades finishes until the time that a variation in the displacement speed and direction of the particles, shapes, groups of particles, contours, and/or slopes of the fluid product finishes due to said variation in the displacement of the mixing blades, also provides relevant information that helps to precisely determine the rheological properties of the fluid product.

The third analysis may also include determining the duration of the variation determined by each first parameter, and the duration of the variation that's determined by each respective second subsequent parameter, and use said durations of the variations for the calculation of the rheological properties parameter of the fluid product.

In other words, the difference in the elapsed time during which the displacement speed of the mixing blades is varying, and the elapsed time during which the displacement direction and speed of the particles, shapes, groups of particles, contours, and/or slopes of the fluid product are varying as a consequence of the variation of the displacement of the mixing blades, also provide relevant information allowing for a better calculation of the rheological properties of the fluid product.

The second algorithm may be, for instance, a visual recognition algorithm. Diverse strategies are known by the experts that allow for the detection and identification of particles, shapes, groups of particles, contours, and/or slopes in pictures or a sequence of pictures through visual recognition algorithms.

Another embodiment proposes obtaining data related to the displacement speed of the blades of the mixer drum, comprises that the first algorithm:

- analyzing the aforementioned at least one image sequence of the fluid product;
- identifying edges, ridges, joints, lines, marks, and or stains on the mixing blades, and/or of the mixing drum when it's a rotating drum, in the different images of the aforementioned at least one image sequence;
- tracking displacement direction and speed of the edges, ridges, joints, lines, marks, and or stains during at least a period of time.

According to the described above, the data related to the displacement speed of the mixing blades is also deduced from an automatic analysis, performed by the first algorithm, of at least a sequence of images of the fluid product that feature as well parts of the mixing blades and/or interior walls of the mixer drum, thus enabling the automatic detection, for instance through a visual recognition algorithm, of edges, ridges, joints, lines, marks, and or stains of the mixing blades or on the mixer drum. The tracking of the displacement of the detected elements, along the sequence of images, enables the determination of the direction and speed of rotation of the mixer drum and its blades, without the need of additional sensors connected to the mixer. This simplifies the system and lowers its cost, while providing increased robustness, by employing fewer elements susceptible to failure.

Alternatively, the obtention of the data related to the displacement speed of the mixing blades and the mixer drum can be performed with a device that detects and measures the rotation of the mixer drum. There are many possible embodiments of said device, for instance, a magnet fixed on the drum's wall and placing a Hall Effect detector that detects each revolution of the mixer drum, or an optical sensor focused towards the surface of the mixer drum, detecting the displacement of a series of marks and/or irregularities on said surface. Other embodiments comprise, for instance, that the actuator of the mixer drum, or the device that controls said actuator of the mixer drum, acts as the detector device for the rotation of the mixer drum, providing information related to said rotation to the processor that implements the first algorithm.

The first algorithm may also analyze, as part of the data related to the displacement speed of the mixing blades inside the mixer drum, data of vertical and horizontal acceleration of the mixer drum, for instance, as provided by a multiaxial accelerometer.

According to a preferred embodiment, the mixer drum will be integrated into a vehicle, such as a concrete mixer truck, where the fluid product is mixed during transport. On said vehicles the mixer drum rotates around an axis inclined respective to the horizontal, and features a narrow opening concentric with the inclined axis, remaining the majority of the interior volume of the mixer truck below said opening. The mixer drum usually features helicoidal mixing blades, also known as Archimedes screw, fitted to the interior of the mixer drum, that improve the mixing of the fluid product, and retains it inside the mixer drum when it rotates in one direction, or expels it through the opening when the drum rotates in the opposite direction.

When the mixer drum is integrated into a vehicle, such as the concrete mixer truck described above, the horizontal and vertical displacement and acceleration of the truck will influence the movement of the fluid product contained within the mixer drum. Therefore, the data of horizontal and vertical acceleration of the mixer drum may also be considered to determine the rheological parameters of the fluid product.

For example, said acceleration data may be used to determine a period of time during which no horizontal or vertical accelerations are detected, and proceed the to execute the first and second analysis during at least a period of time devoid of horizontal and vertical accelerations. This way the system avoids the displacement of the mixer truck interfering with the rheological properties calculation.

The proposed method may also include, in another embodiment, a fourth analysis, performed by a computer processing unit that implements a fourth algorithm, that comprises the detection of at least one rheological parameter that is out of predefined bounds, and generate, in response to said detection, an alert signal.

In other words, when the fourth algorithm analyzes the at least one rheological property parameter obtained from the calculation, it determines if it's within bounds of predefined values, considered as acceptable values. When that's not the case, the fourth algorithm raises an alert signal.

Said predefined values will be stored, being accessible to the processor, and could have been defined manually or automatically, considering, for instance, the composition of the fluid product, and/or requisites demanded by the user of the fluid product.

Said alert signal could be simply recorded, or could be transmitted to a user to evaluate the actions to take to correct the rheological properties parameters of the fluid product.

The method proposes, additionally, that in response to the alert signal, a fifth analysis can be performed, through a computer processing unit that implements a fifth algorithm. The fifth algorithm comprises:

- obtaining information related to the composition and quantity of the fluid product inside the mixer drum;
- calculating a series of modified rheological properties parameters of the fluid product, considering at least the information related to composition and quantity of the fluid product, the rheological properties parameter calculated by the third analysis, and a corrective admixture with a determined composition and quantity added to the fluid product, calculating the composition and quantity of said corrective admixture so that the modified rheological properties parameter of the fluid product fits within the predefined acceptable bounds.

In other words, the fifth algorithm has access to the composition and quantity of the fluid product contained within the mixer drum, typically because said information will be stored in a place accessible to the processor, and the fifth algorithm calculates how the addition of different admixtures, in different quantities, will affect the rheological properties parameters of the fluid product, considering said information of composition and quantity of the fluid product, allowing the obtention of a forecast for the modified rheological properties parameters. This enables the fifth algorithm to determine which admixtures, and in which quantities, allow the correction of the rheological properties parameters of the fluid product to fit within the predefined bounds.

The fifth algorithm may perform said calculation of the admixtures, for instance, through an iterative calculation of the different alternatives and different quantities of admixtures and/or combination thereof, discarding those options that move the end result away from the desired result, and calculating additional variations closer to the options that provide results near the desired results until it obtains an optimal option.

It's understood that within the field of cement-based fluid products, the admixtures selected may be, among others, water, plasticizers, superplasticizers, viscosity modifying agents, air entrainers, setting accelerators, setting retarders, fibers, pozzolanic additions such as microsilica, etc.

Once the composition and quantity of a corrective admixture has been determined, such that, once added to the fluid product, a forecast can be obtained for the modification of the rheological properties parameters, calculated through the third analysis, until reaching a corrected parameter of the rheological properties that's within predefined bounds, the system can communicate said composition and quantity of admixtures required to a user so that the admixtures are added manually, in the calculated composition and quantity.

Alternatively, the processor may control actuators associated to, for instance, admixtures tanks, allowing the processor to perform said addition of admixtures automatically, according to the calculated composition and quantity.

Optionally, the fifth algorithm may also consider, in order to perform said determination of composition and quantity of corrective admixtures, data matrixes that store and correlate the following data of the aforementioned examples:

- initial composition and quantity of the different fluid products;
- at least one rheological properties parameter of each of said initial compositions;
- one composition and quantity of a corrective admixture added to each of said different fluid products;
- at least one rheological properties parameter of each of said different fluid products after the addition of the corrective admixture.

In such case, instead of performing an iterative calculation which calculates different alternatives until it reaches those that yield the best results, without any previous reference of which are the corrective admixtures that will probably cause the desired correction, the fifth algorithm may take into consideration a database containing examples on how the rheological properties parameters of different fluid products, with different compositions and/or quantities, are affected when the different corrective admixtures, with different compositions and/or quantities, are added into them. This data matrix would allow the fifth algorithm to determine, based on the aforementioned examples, which are the compositions and quantities of corrective admixtures that will have the highest probability of causing the desired effect to the current fluid product, by analyzing past fluid products with similar compositions and similar initial and/or modified rheological properties parameters as those featured by the fluid product currently contained within the mixer drum.

The fifth algorithm may also use the information obtained from said database as a starting point for an iterative calculation as described above.

The proposed method may comprise, furthermore, detecting, through a first analysis, a stoppage of the mixing blades within the mixer drum, and perform a sixth analysis, in a computer processing unit that implements a sixth algorithm, comprising:

- detecting variations in the optical and/or smoothness properties of the surface of the fluid product, within the image sequence, during a period of time immediately after the detected stoppage, determining a sixth parameter; and using said sixth parameter in the calculation of the rheological properties of the fluid product.

According to the aforementioned, when the mixing blades stop, the sixth algorithm analyzes several optical and/or smoothness properties of the surface of the fluid product during a period of time immediately subsequent to said stoppage. The optical properties may include shine, reflectance, transparency, color, and others. These optical properties provide relevant information as well, that can be used to determine the rheological properties parameters of the fluid product. For instance, a considerable increase in shininess of the surface may be indicative of an excessive fluidity of the fluid product.

The surface smoothness of the fluid product, namely the variation in roughness of said surface following the stoppage of the mixing blades, also provides relevant information on the rheological properties parameters of the fluid product. For instance, the complete or substantial disappearance of surface roughness may be indicative of excessive fluidity and/or of an excessive sinking of the aggregates particles.

The present invention proposes as well, as part of its method, obtaining a sequence of images from the interior of the mixer drum prior to pouring, for transportation, the fluid product in its interior, also known as a batch or a load, and, through a visual analysis of said images, detect a certain quantity of any fluid product remaining inside the mixer drum. The fluid product remaining in the interior of the mixer drum prior to a new load will usually be a remainder of a previous load or washing water.

In occasions it's not possible to unload the entirety of the fluid product delivered to the site, and the trucks return to the batching plant with a remainder of the original load; in other occasions the delivered product is unloaded completely but the truck returns to the batching plant with a volume of water, used for washing the truck and the mixer drum after finishing the pour, in the interior of the mixer drum. Upon detection of any of these cases a water and/or fluid product quantity is estimated to be present inside the mixer drum, and with said estimation taken into consideration, an initial composition and quantity of a fluid product is calculated and poured into the mixer drum, such that after its mixing and blending with the remainder already contained in the mixer drum, produces a composition and quantity of fluid product complying with the required rheological properties of the new load.

Estimating the volume of the remaining fluid product and adding a new material, in occasions re-classifying the combination as a different quality or grade (usually lower), allows for the reuse of the remaining fluid product instead of discarding or recycling it. For this purpose, it's important to know with precision the volume remaining and the additions of water and/or admixtures carried out during transport and/or on site, with the present invention providing much more reliable information than visual estimates performed by truck drivers.

The method can also include detecting added water and/or added admixture to the fluid product by performing a seventh analysis, in a computer processing unit that implements a seventh algorithm, comprising:

analyze the rheological properties of the fluid product detected in the third analysis detecting variations thereof over time;

detect unexpected variations of the rheological properties of the fluid product over time by comparing the detected variations with expected variations of the rheological properties of the fluid product over time due to its expected curing process, considering stored information about composition of the fluid product;

detect an amount of added water and/or added admixtures added to the fluid mixture responsible of the unexpected variations of the rheological properties of the fluid product over time by calculating the amount of added water and/or added admixtures required to, when mixed with the fluid product with known composition, modify the expected variations of the rheological properties of the fluid product over time to match with the detected variations of the rheological properties of the fluid product over time.

The expected variation of the rheological properties of a fluid product of known composition can be calculated in advance, based on stored information from experimental tests on different fluid products of different compositions where the variations over time of the rheologic properties of said different fluid products has been measured and stored. Said stored information can be used to calculate the expected variation of the rheologic properties of other fluid products different from the fluid products submitted to the experimental tests.

According to a second aspect, the present invention embodies a monitoring system for contactless assessment of rheological properties of cement-based fluid products, comprising:

a mixer drum with an opening and including mixing blades in its interior; at least one image acquisition device focused towards the interior of the mixer drum; and at least one computing unit that features at least one processor configured to implement the method described above.

The mixer drum will be, in a preferred embodiment, a drum rotating around an inclined axis, being the opening concentric to said axis, and being the mixing blades a set of helicoidal blades attached to the interior of the mixer drum's surface, being the mixer drum mounted on a truck.

The system may comprise, additionally, a user interface, located in the truck's cabin, in communication with the aforementioned at least one computing unit to display at least some of the results of the calculations performed as a part of the described method, and optionally also the images obtained from the interior of the mixer drum.

Typically it will display the rheological properties parameter calculated for the fluid product contained within the mixer drum, either by a specific value, for instance a value equivalent to the one obtained with an Abrams Cone test (ASTM C-143), measured in slump with distance units (inches, millimeters, centimeters, etc.), or with an indication on an arbitrary scale, for instance indicating simply if the rheological parameter is within a predefined range, or a little above or below range, or way above or below range, for instance, with a color code.

Other information that may be displayed by the user interface is, for example, the calculated composition and calculated quantity of admixtures required to correct the rheological properties parameters of the fluid products.

In an embodiment of the invention at least a part of the aforementioned at least one computation unit is an external unit not mounted on the mixer truck, which establishes wireless communications with the rest of the system mounted on said mixer truck. This allows, for instance, that the most delicate and expensive computing equipment can be operated at a secure location, with better maintenance and without the risk of receiving impacts, weather exposure, etc.

In another embodiment the system may include, moreover, additional trucks with mixer drums associated to additional image acquisition devices, all of them connected via wireless communications with at least one aforementioned part of the at least one computation unit external to the trucks. Therefore, the aforementioned at least one external part of the computation unit will control simultaneously the fluid product of multiple mixer drums on different trucks, resulting in a shared computation unit.

In a preferred embodiment the image acquisition device will be located outside the mixer drum, facing the opening used to load the fluid product into it. In a preferred embodiment said image acquisition device will be one or more video cameras, and/or one or more infrared cameras, and/or one or more laser detection and location device, also known as LIDAR, that obtain a three-dimensional reading of an object's geometry, in this case the interior of the rotating drum and the surface of the fluid product.

The image acquisition devices may be installed with stabilizer devices to dampen vibrations, movement, and/or accelerations, improving the quality of the images acquired for processing. Additionally, these corrections can be performed via software, in replacement or complementing the aforementioned stabilizer devices.

The present invention is also related, according to a third aspect, to a computer product that understands coded instructions that, when executed in a computing device, implement the method described above.

Other characteristics of the invention will be described in the following detailed exemplary embodiment.

BRIEF DESCRIPTION OF THE DRAWINGS

The present disclosure will become more fully understood from the following description of an exemplary embodiment taken in conjunction with the accompanying figures and drawings, which are to be understood as illustrative but not limiting, wherein like reference numerals refer to like elements, in which.

DETAILED DESCRIPTION OF AN EXEMPLARY EMBODIMENT

The enclosed drawings and figures show exemplary embodiments by way of illustration but not limitative of the present invention.

Figure 1:
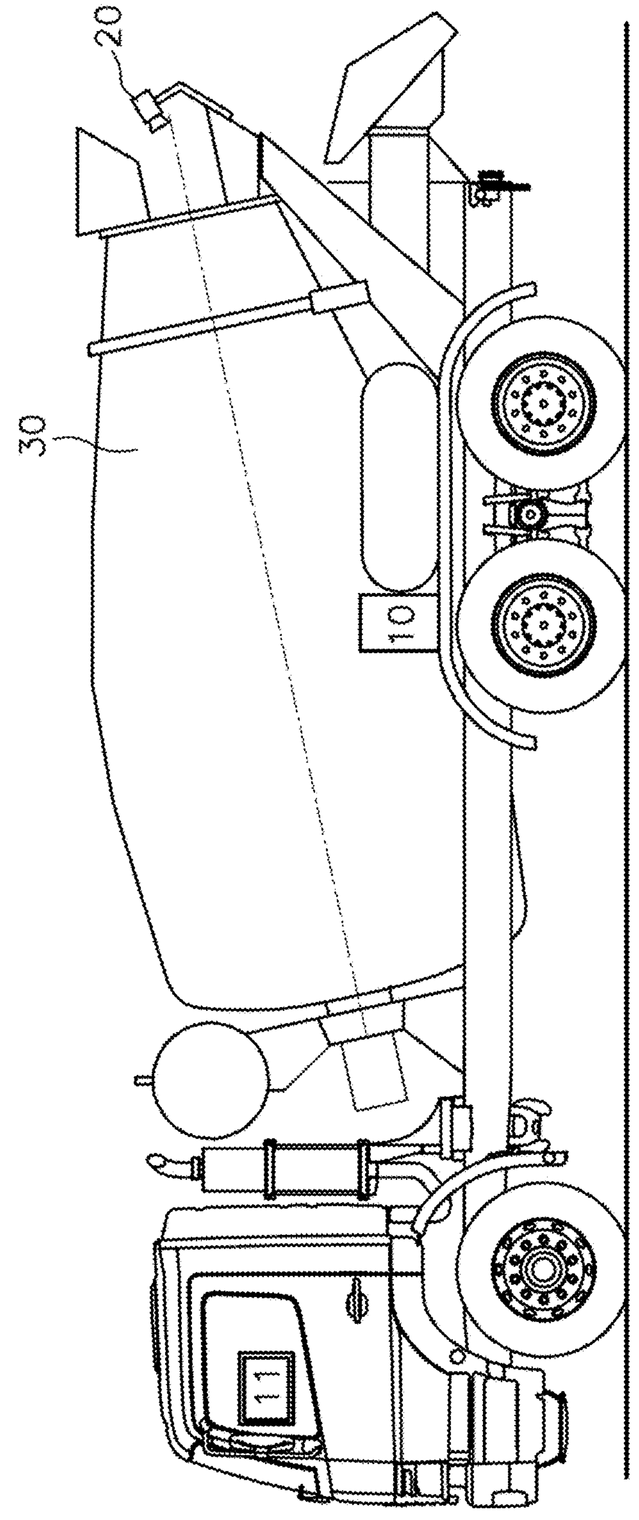
FIG. 1. is a schematic view of the side elevation of a concrete mixer truck featuring a mixer drum and equipped with the present system, according to a first embodiment in which all the components of the system are mounted on said truck, and the method is fully executed on said truck.

The system proposed in this disclosure, according to the embodiment represented by FIG. 1, includes a mixer drum 30, rotating along an inclined axis, mounted on a concrete mixer truck and featuring a set of helicoidal mixing blades 31 attached to the interior of said mixer drum, and a narrow opening concentric with the inclined axis and located on the top part of the mixer drum 30.

Located outside of the mixer drum 30, facing its opening and focused towards the interior of the mixer drum 30, is at least one image acquisition device 20, normally one or more video cameras, with normal and/or infrared vision, and/or a LIDAR measuring system providing a three-dimensional map of the volume of the mixing blades and the fluid product moving inside the interior of the mixer drum, providing detection of the slopes of the fluid product.

Figure 3A:
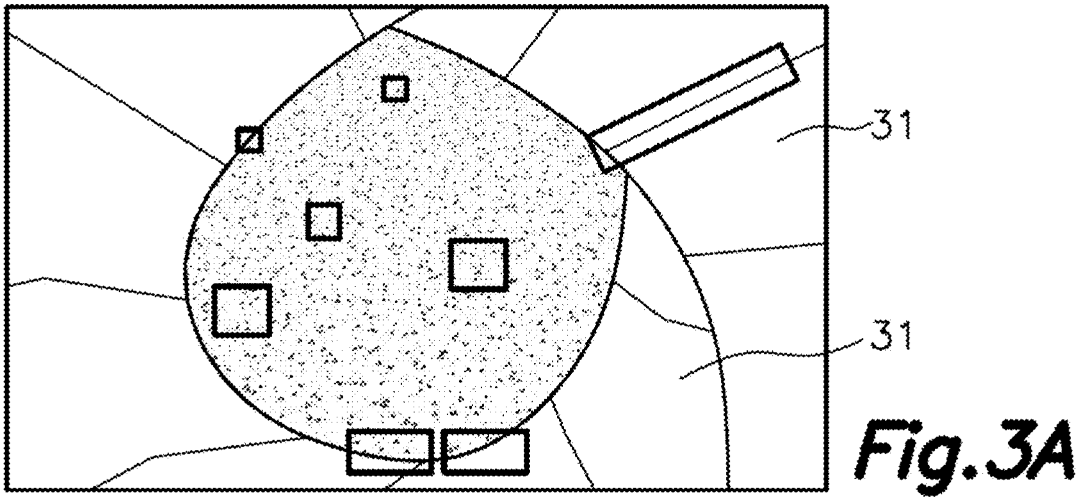
FIG. 3A, FIG. 3B, and FIG. 3C are schematic views of the sequence of images from the mixer drum's interior acquired by the at least one image acquisition device, where the mixing blades and the surface of the fluid product are visible, where different particles, shapes, groups of particles, contours, and/or slopes of the fluid product, and the edges, ridges, joints, lines, marks, and or stains of the mixing blades are represented by rectangles, identified respectively during the second and first analysis, and where the displacement directions and speeds for the aforementioned identified elements are represented by arrows.
Figure 3B:
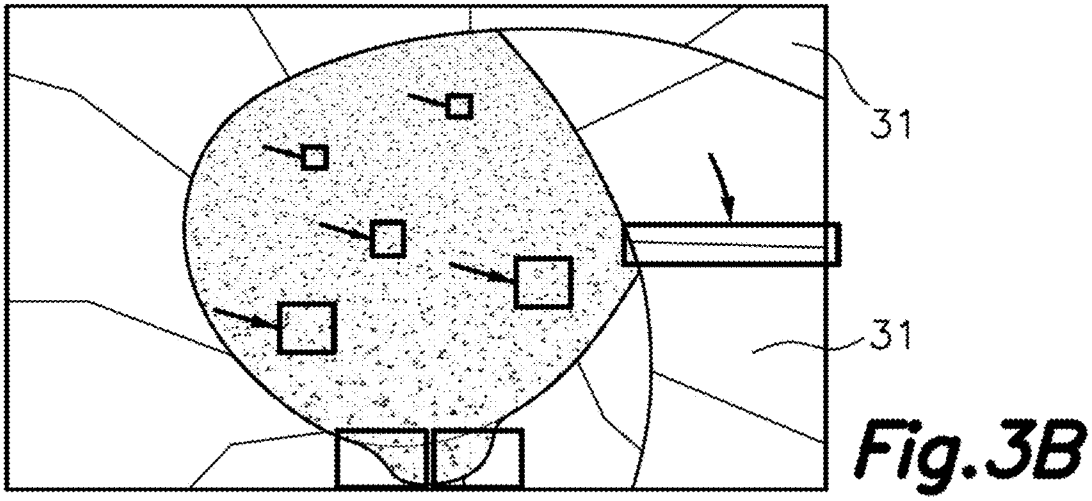
Figure 3C:
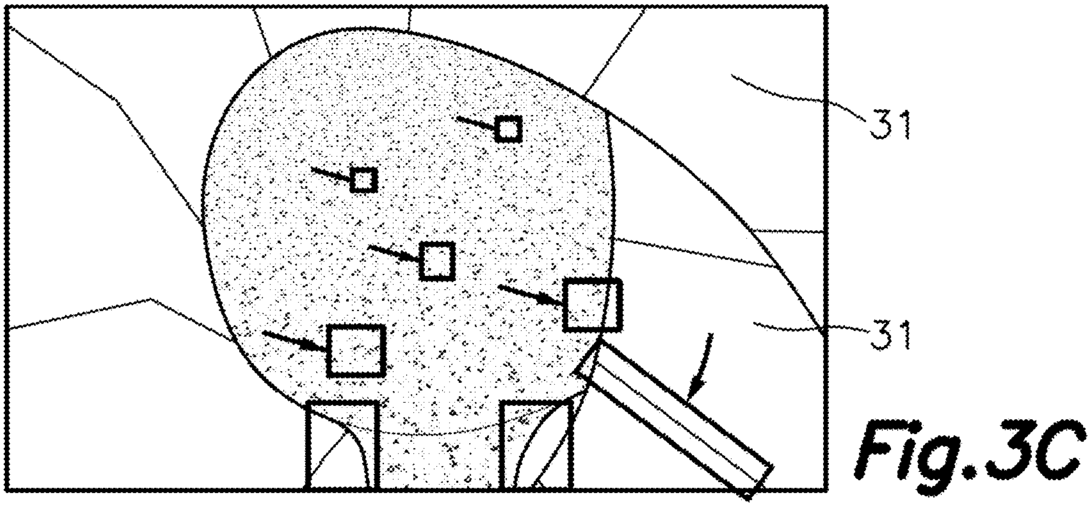

The system also comprises of at least one computation unit 10 featuring at least one processor and connected to said at least one image acquisition device 20 to acquire image sequences from the interior of the mixer drum 30, as shown on FIG. 3A, FIG. 3B and FIG. 3C.

Within this image sequence, provided as way of example, rectangles have been used to highlight some of the identified elements, as well as their displacement direction and speed schematically represented by arrows. The identified elements include particles and groups of particles on the surface of the fluid product, as well as a frontal edge that, in FIG. 3B and FIG. 3C flows over one of the mixing blades and falls, becoming a slope. Within these pictures a mark on one of the mixing blades has been identified and represented with a line, allowing for the automatic detection of the rotation speed and direction of the blades 31.

The positioning of the aforementioned at least one image acquisition device differs according to the particular design of each mixer truck and mixer drum, but generally it's located in an area close to the loading chute, so that it has a viewing angle sufficient to record at least a portion of the surface of the fluid product contained inside the mixer drum, preferably a major proportion of said product, considering also the different levels of filling of said rotating drum according to the volume of fluid product contained therein.

In some configurations the image acquisition device can be installed above the loading chute, while in others it can be installed below it. In general terms, one will try to install these devices in an angle relative to the mixer drum's axis in such way that a good view of its interior can be obtained, while they don't disturb or are affected by the loading of the fluid product into the mixer drum, and the cleaning of said drum.

Given the characteristics of the loading and subsequent cleaning of the mixer truck (indispensable after each load) that are commonplace, it's proposed in one embodiment that said at least one image acquisition device 20 is fixed to the rest of the truck with a movable support, switching from an operation position, as described so far, to a folded or protected position in which said at least one image acquisition device 20 is kept removed from the drum's opening, facilitating the loading, cleaning, and unloading operations, thus protecting said device.

Optionally, the displacement of said at least one image acquisition device 20 can be an automatic displacement, controlled by the computation unit 10, for instance, when the acquisition of images is required to execute the proposed method.

Optionally, it is proposed that the truck's cabin includes a user interface 11, usually a screen or touchscreen, that displays to the driver the information provided by the system, in particular the rheological properties parameters of the fluid product calculated by the system, as well as suggested admixtures to be added, in case these are calculated. Optionally, this user interface may be a wireless interface, featuring a battery that allows for its operation outside the truck's cabin as well. In this case the interface can be a mobile phone, a tablet, a laptop computer, or any other equivalent device, featuring a specific software application, acting as the user interface 11.

This user interface 11 may alert of deviations of the rheological characteristics, speed of rotation and number of revolutions of the drum during transport, actions taken automatically by the system or actions that the user needs to authorize and/or perform manually, etc. This element is used, additionally, to obtain information about the visual assessment of rheological properties that the drivers perform, as is commonplace in the industrial practice, and use said information to improve the training of the Artificial Intelligence algorithms. There are certain mechanisms to promote participation and precision in these assessments, such as "gamification" techniques where the visual rheological assessment becomes a competitive game between drivers and rewards the ones that provide the most precise evaluations.

Given that the optical devices that are part of the at least one image acquisition device are delicate, additional measures can be added to protect them during the loading and subsequent cleaning operations. These can take multiple forms, for example, the aforementioned movable support, and/or an air current that blows away dust and droplets from the optical devices, and/or a sprayed water jet device to clean the optical devices, etc.

The system is able to determine, through the analysis of at least one sequence of images obtained by the image acquisition device 20, if the vision of the cameras and/or LIDAR is totally or partially obstructed, if the cameras lost focus, if the viewing angle is incorrect, etc.

Signaling elements may be added to the rotating mixer drum, in a way that they don't affect the normal operations (e.g. a small plate with a bar or QR code, or a certain clearly distinguishable color and/or shape, etc.), that help in determining the correct calibration of both the image quality and the viewing angle of the optical devices.

In case the system detects any inconvenient and when it's not able to correct it automatically, it will emit an alert to the corresponding personnel indicating the issue and the necessary adjustment; once resolved it will check again for a correct operation and inform the corresponding personnel whether the intervention has been successful or not.

Additionally, the system may feature a light source to light up the interior of the mixer drum 30, that is activated when convenient, to improve the quality of the acquired images, facilitating their subsequent analysis. This light source may be of white light and/or of particular wavelengths (colors), adjusted or automatically adjustable, that improve the image acquisition and subsequent processing.

The system comprises at least one memory storage unit that stores the acquired images. The system may also include a wireless communications antenna for the transmission of information to remote devices, to a wireless user interface 11, and/or to receive instructions. Said wireless antenna may be used, for instance, to communicate to the system relevant information about the fluid product loaded inside the mixer drum 30, for example the composition and quantity of fluid product, the predefined acceptable range of rheological properties parameters, etc.

Optionally the computation unit 10 and the user interface 11 may be integrated in a single device.

The computation unit 10 will be, in a preferred embodiment, a computer with enough capacity to perform certain analysis in real time and without the need to connect to a central server, given that said unit has already stored the necessary Artificial Intelligence models to apply in each case; said models can be downloaded automatically for each load and for each fluid product composition, in case they can't all be stored in its internal memory storage. This type of computers is commonplace in the industrial practice, for instance models such as Raspberry Pi, Arduino, and similar.

It is possible to incorporate one or more remote computation units, such as servers and/or central computers, that store all the records, video files, images, etc., and that generate the analysis models used by the system mounted on the truck, based on Artificial Intelligence learning algorithms. In other words, these remote units will store historical data of past examples, which will be used for the calculations of the proposed method, and/or for the improvement of the algorithms employed for said calculations.

These units carry out all the functions that, given their capacity, cannot be performed by the units mounted on the truck, and those that are not necessary in real time, such as the storage of historical data (databases, etc.), generating and updating Artificial Intelligence evaluation models, etc.

Optionally, the system can include a cleaning system for the lenses and optical devices, that can be activated automatically when needed, for instance a water or air pressure cleaning; the concrete mixer trucks feature as standard said pressurized circuits.

Optionally, other sensors can be included, such as sensors that determine the inclination angle of the truck, both in the longitudinal as the transversal axes, to take this information into consideration when evaluating the rheological properties of the fluid product. Additionally, horizontal and vertical acceleration sensors can be included, to account for the movement of the truck when performing the rheological assessment, or to discard certain data that are obtained during periods with considerable accelerations.

Optionally, images and video recordings can be obtained of the control and acceptance tests, such as the Abrams Cone test (ASTM C-143), to add this information to the training data set and thus be able to perform quantitative and qualitative assessments with a higher degree of precision and quality. For this purpose, it is planned to use a portable camera, for instance integrated into the wireless user interface device 11, or attached to a stand, a tripod, a support arm, etc., that fixes the camera in an adequate and reproducible position (within a tolerance margin), optionally a sheet or plate to improve contrast, and/or a light source. This camera will record the performance of the various rheological assessment tests and can obtain both quantitative and qualitative data of the fluid product, which are constantly incorporated into the data matrixes that feed the learning and evaluation models.

Figure 2:
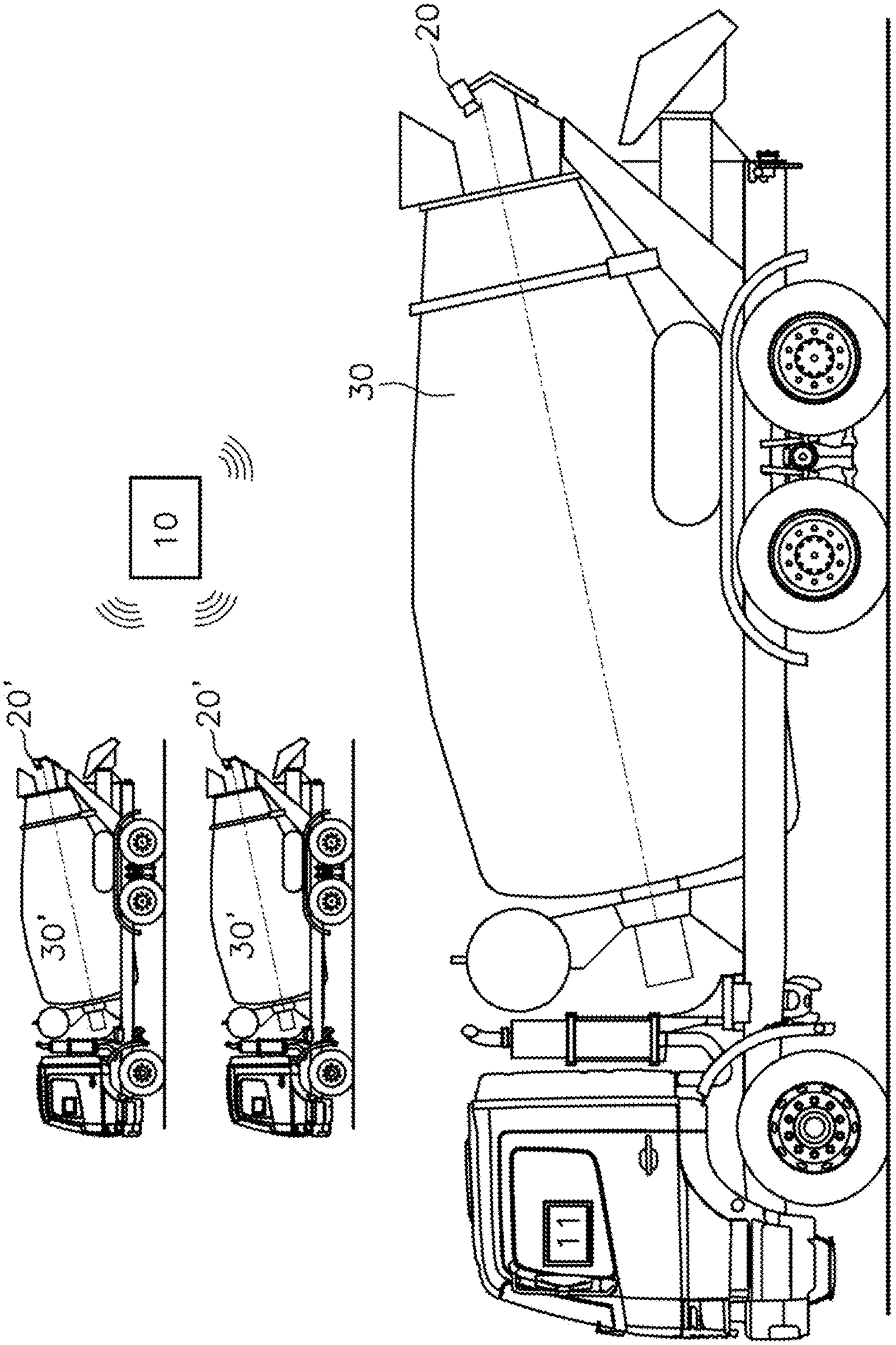
FIG. 2. Is a schematic view of the side elevation of a concrete mixer truck fleet, the system including a computation unit located remotely and in wireless communications with each of the trucks in the fleet, each of said trucks featuring a mixer drum and at least one image acquisition device.

According to another embodiment as per FIG. 2, the aforementioned at least one computation unit 10, or at least some parts of it, are external to the truck, minimizing thus the number and complexity of the devices mounted on the truck, and said computation unit may, in turn, control additional mixer drums 30', each featuring at least one additional image acquisition device 20', equivalent to the mixer drum 30 and the image acquisition device 20 described so far.

In this way, the devices mounted on the trucks are minimized, and resources can be shared, allowing central computing unit to perform most of the calculations for the multitude of trucks in a fleet.

Regarding the proposed method, FIG. 3A, FIG. 3B, and FIG. 3C show a schematic sequence of images from the interior of the mixer drum 30 obtained by an image acquisition device 20, where it can be noticed that the mixing blades 31 of the mixer drum 30 have turned and thus a displacement of the particles of the surface of the fluid product has occurred.

In these figures the particles, edges, marks, etc., have been represented with rectangles, automatically detected by the algorithms, and the arrows represent the displacement direction and speed of said detected elements.

It can be appreciated in these figures how the fluid product flows over the front of one of the mixing blades 31, as said blades 31 turns. The detection of said overflow, of the height reached by the fluid product before flowing over, of the speed of the fall, and/or of its contour during said fall are particularly revealing of the rheological properties of the fluid product.

The fluid cement-based products, such as concrete, are often modelled as a plastic or Bingham fluids, which have a minimum yield stress required to produce a displacement (usually described in term of a shear or agitation speed, "shear rate"). The relationship between the shear rate and the shear stress necessary to produce movement in the fluid is known as viscosity, and can be deduced from the slope of the curve when represented on a shear rate vs. shear stress diagram.

Due to these rheological characteristics, the agitation or mixing speed of the fluid product is a key parameter for the rheological evaluation, therefore the proposed system is capable of assessing the rheology of the fluid product in question at different mixing speeds, which can be even zero (resting speed), thus considering the effect of accelerations and decelerations of the mixer drum to perform and improve the evaluation. The concrete mixer trucks always feature a rotation speed control for the mixer drum, on which the system can actuate if the truck's configuration allows, or instruct the truck driver to modify said rotation speed to perform the rheological evaluation. For this reason, the computation unit of the proposed system may have direct control over said speed of rotation of the mixer drum, or can instruct the operator, typically the truck driver, through the aforementioned user interface 11.

During the agitation or mixing, the system evaluates the volume of fluid product contained within the mixer drum and its movement, for particles or groups of particles that can be identified on the surface (evaluating position, rotation, speed, direction, acceleration, etc.) as well as the whole surface of the whole of the fluid product, for instance determining the height the fluid product reaches over the mixing blades before flowing over and falling, angles and slopes that the fluid product reaches inside the mixer drum, if during the fall the fluid product remains together or it separates into chunks or droplets (may also include the size, shape, distribution, etc. of said droplets), if it generates splashes as it falls, among others.

The evaluation of the fluid product at low mixing speed, or at resting speed, and specially during the transition between mixing and resting speeds, on top of allowing for a better quantitative evaluation, also allows for a qualitative evaluation of characteristics like segregation (sinking of the larger particles to the bottom due to density differences and loss of cohesion), the effect known as "bleeding" (appearance of a liquid phase, usually of a different shade and/or with spots, on the surface, which may also be accompanied by the appearance of bubbles and/or foam), among others, that cannot be appreciated when the fluid product is being mixed because these effects do not occur while the fluid product is being agitated.

Besides the aforementioned, the present system is capable of determining, also by visual analysis and using the same hardware devices, the speed and direction of rotation of the mixer drum, and record the number of rotations. Both the rotation speed during transport as the number of revolutions are usually limited (with minimum and maximum values) in the applicable standards.

Additionally, the system can check that the mixing or "re-mixing" process is carried out according to specifications, understood as a minimum amount of time and/or number of revolutions that the mixer drum must rotate at a minimum predefined speed, after the addition of any substance used to modify the rheological properties of the fluid product, such as water and/or admixtures.

Additionally, the system can detect the addition of water, admixtures, and other materials, whether authorized or not, through the analysis of the acquired images. A complete video recording of the entire loading, transport, and unloading process can be stored, to improve the traceability of the whole process, and for that end any obstruction or deactivation of the system can also be recorded and flagged as suspicious activity of unauthorized manipulation or tampering, especially if by the end of said obstruction or interruption a noticeable change has taken place in the rheology of the fluid product.

Yet another advantage is that, given known additions of water and/or admixtures, a "before-and-after" evaluation can be performed, and by knowing the composition and proportions of raw materials in the fluid product, they allow the personnel versed in mix composition design to obtain water and/or admixtures dosage vs. rheological properties curves, such as water content vs. slump, which are a very useful tool when employed in the design and optimization of mix compositions. The system can record and produce said curves and relationships automatically based on data coming from different sources.

The system can also detect, moreover, rheological variations that are difficult to explain based on the proportions of raw materials in the mix, in other words, when the proportions and loading of said raw materials components are correct. This occurrence is commonplace in the industrial practice, and may indicate that one or more of the raw materials employed have changed in their characteristics, thus producing a change in the rheology of the fluid product, even when their dosage has been the same as in past occasions. This may also indicate a miscalibration of one or more raw materials scales and/or dosage systems at the batching facility. Even though the system is not intended to identify the causes of these variations, the mere detection and immediate notification to the corresponding personnel provides great value and novelty.

The system can detect lumps of dry materials inside the fluid product, that are usually caused in certain loading conditions when the aggregates and the cement are not fully mixed with the water, and also when the aggregates employed in the production already contain such lumps or particle agglomerations (usually caused by contamination with clays). The system can also detect other anomalous materials when their size is large enough (for instance, starting at double the maximum size of aggregates and upwards), such as pieces of wood, plastics, etc., that are usual contaminations of the aggregates and are detrimental to the performance and/or casting of the fluid product.

Yet another advantage of the system is that it can estimate the remaining volume of the fluid product inside the mixer drum based on the visual information acquired of the fluid product in movement and/or resting, and/or from three-dimensional information of the fluid product in movement and/or resting, and/or by the number of revolutions of the mixer drum in the loading and unloading direction. This complementary information is of high value in the industrial practice, both for the determination of poured volume as for remainders of returned products, and/or for the addition of water and/or admixtures in a correct proportion if it was necessary to adjust the rheology of a partial load, for instance, when the pouring procedure is slow and the remainder product loses fluidity after some time.

The system can also detect a remainder of fluid product and/or washing water inside the mixer drum prior to a new load, and alert the corresponding personnel. It's a frequent problem in the industry that trucks, that are supposedly empty, enter the loading area with washing water still inside the drum, which alters the rheology of the fluid product loaded into them and produces quality issues.

Furthermore, the system can detect damage and/or wear of the mixer drum and its mixing blades, for instance, the loss of wear plates that are usually welded to the edge of the mixing blades so that abrasion of the fluid product does not wear the blades out.

Example 1

According to a particular exemplary embodiment, a single video camera is installed and a complete load (six cubic meters) of the fluid product is analyzed for its behavior during transport inside a concrete mixer truck, for concrete product of type HA25/B/20/IIa (in Spain it's one of most commonly used reinforced concrete mixes), with the following composition for one cubic meter of concrete:

Cement CEM II A-M (P-L) 42.5 R: 280 kg

Fine aggregate: natural siliceous sand AF-0/4-M-S-L (4.34% moisture content): 897 kg Coarse aggregate: crushed siliceous gravel AG-4/20-M-S (0.57% moisture content): 950 kg Water (network): 160 liters Plasticizer admixture: Sikaplast 1003: 1.68 kg Superplasticizer admixture: Sikament 3003: 2.52 kg Some properties of the constituent materials are known, for example the grading curves (particle size distribution) of the fine and the coarse aggregates, the sand equivalent of the fine aggregate, the moisture content and water absorption of the aggregates, etc., as well as characteristics of the cement, admixtures, and the mixing water. All materials comply with the standards' specifications for their use in concrete production. It's verified that the concrete mixer truck does not have any remainders of washing water from a previous load, nor any other materials prior to loading.

The following values have been obtained on the tests performed on the fresh concrete:

Slump, as per Abrams Cone test (ASTM C-143): 60 mm

Air content: 3.9%

Density: 2259 kg/m$^3$

Electrical resistivity (manual resistivity meter with 4 electrodes): 5 Ohm/m

Visual assessment: standard workability, no segregation or bleeding, correct proportion of fine and coarse aggregates. All the values obtained are within normal ranges for the mixture at hand.

Both the mixture composition and the characteristics of the raw materials, as well as the test results of fresh concrete and visual assessments were made available to the Artificial Intelligence system that correlates said information with the images acquired by the camera during the mixing inside the truck's drum. Based on a certain amount of test results and image analysis the system is capable of adjusting the different relative weights of the neural networks to identify the properties of the images leading to a rheology assessment, in this example expressed as millimeters of slump according to the Abrams Cone test as described in ASTM C-143, with a high-enough degree of confidence.

The invention claimed is:

1. Computer-implemented method for contactless assessment of rheological properties of cement-based fluid products, the method comprising:

obtaining first data related to a displacement speed of a set of helicoidal mixing blades attached to an interior surface of a mixer drum configured to rotate about an inclined axis and mounted on a truck during at least one period of time;

obtaining at least one image sequence of a fluid product contained within the mixer drum during the at least one period of time;

determining a plurality of first parameters, in a first analysis, related to variations of the displacement speed of the set of mixing blades over time by implementing, in a computer processing unit, a first algorithm;

determining a plurality of second parameters, in a second analysis, related to variations of a local displacement direction and speed of a surface of a fluid product contained in the mixer drum over time by implementing, in a computer processing unit, a second algorithm that:

analyzes the at least one image sequence identifying particles, and/or groups of particles, of the surface of the fluid product and a displacement direction and speed thereof during the at least one period of time, indicative of a local displacement direction and speed of the surface of the fluid product;

detects variation in the local displacement direction and speed of the surface of the fluid product obtained from the analysis of the at least one image sequence;

calculating, in a third analysis, at least one rheological property parameter of the fluid product by implementing, in a computer processing unit, a third algorithm that:

detecting and measuring a temporal correlation existing between each first parameter, representing a variation in the displacement speed of the set of mixing blades, and one of the second parameters, representing a variation of the local displacement direction and speed of the surface of the fluid product contained in the mixer drum, occurring following the corresponding first parameter; and calculates, based on the detected temporal correlations, at least one of the rheological property parameters of the fluid product.

2. The method according to claim 1, wherein the third algorithm utilizes, to calculate the at least one rheological properties parameter of the fluid product, data matrixes that store and correlate the following data recorded from previous assessments of rheological properties of cement-based fluid products:

variations in the displacement speed of the mixing blades;

variations in the displacement direction and speed of the particles, and/or groups of particles of the fluid product;

at least one rheological properties parameter of each fluid product.

3. The method according to claim 2, wherein the data matrixes further store and correlate information about the composition and quantity of the fluid product used as a cement-based fluid product on each recorded previous assessment.

4. The method according to claim 1, wherein the detected temporal correlations are measured between:

a starting moment of each variation of the displacement speed of the set of mixing blades, represented by the first parameter, and a starting moment of a variation of the local displacement direction and speed of the surface of the fluid product, represented by the second parameter, occurring following the starting moment of the variation of the displacement speed of the set of mixing blades; and/or one final moment of each variation of the displacement speed of the set of mixing blades, represented by the first parameter, and a final moment of a variation of the local displacement direction and speed of the surface of the fluid product, represented by the second parameter, occurring following the final moment of the variation of the displacement of the set of mixing blades.

5. The method according to claim 1, wherein the second algorithm comprises a visual recognition algorithm.

6. The method according to claim 1, wherein the first algorithm is a visual recognition algorithm configured to:

analyze the aforementioned at least one sequence of images of the fluid product;

identify edges, ridges, joints, lines, marks, and or stains on the mixing blades, and/or of the mixing drum when the mixing drum is a rotating drum, in the different images of the aforementioned at least one image sequence;

track displacement direction and speed of the edges, ridges, joints, lines, marks, and or stains during at least a period of time.

7. The method according to claim 1 where the first algorithm analyzes data provided by a device detecting the rotation of the mixer drum.

8. The method according to claim 1, wherein the acquisition of the first data comprises the acquisition of rotational speed of the mixing blades and also vertical and horizontal acceleration data of the mixer drum where the mixing blades are housed.

9. The method according to claim 8, wherein the at least one period of time, during which the first and second analysis are performed, is a period of time during which no relevant horizontal nor vertical accelerations of the mixer drum are detected.

10. The method according to claim 1, wherein the method comprises performing a fourth analysis, in a computer processing unit that implements a fourth algorithm, that comprises detecting when the rheological properties parameter is out of predefined bounds, and generate, in response to said detection, an alert signal.

11. The method according to claim 10, wherein the method comprises, in response to the alert signal, performing a fifth analysis, in a computer processing unit that implements a fifth algorithm that comprises:

obtaining one information regarding the composition and quantity of the fluid product;

calculate a series of modified rheological properties parameters of the fluid product, considering at least the information related to composition and quantity of the fluid product, the rheological properties parameter calculated by the third analysis, and a corrective admixture with a determined composition and quantity added to the fluid product, calculating the composition and quantity of said corrective admixture so that the modified rheological properties parameter of the fluid product fits within the predefined acceptable bounds.

12. The method according to claim 11, wherein the fifth algorithm takes into consideration, to perform said determination of the composition and quantity of the corrective admixture, data matrixes that store and correlate the following data of previous examples:

composition and quantity of the different fluid products;

at least one rheological properties parameter of each of the initial compositions;

a composition and quantity of a corrective admixture added to each of said different fluid products;

at least one rheological properties parameter of each of said different fluid products after the addition of the corrective admixture.

13. The method according to claim 1, wherein the method comprises detecting, through the first analysis, a stoppage of the mixing blades of the mixer drum, and performing an analysis, in a computer processing unit that implements an algorithm, comprising:

detecting variations in the optical and/or smoothness properties of the surface of the fluid product, within the image sequence, during a period of time following the detected stoppage; and using the variations in the optical and/or smoothness properties of the surface of the fluid product in the calculation of the rheological properties of the fluid product.

14. The method according to claim 1, wherein the method comprises detecting a water addition and/or an admixture addition to the fluid product by performing an analysis, in a computer processing unit that implements an algorithm, comprising:

analyze the rheological properties of the fluid product detected in the third analysis detecting variations thereof over time;

detect unexpected variations of the rheological properties of the fluid product over time by comparing the detected variations with expected variations of the rheological properties of the fluid product over time due to its expected curing process, considering stored information about composition of the fluid product;

detect an amount of added water and/or added admixtures added to the fluid mixture responsible of the unexpected variations of the rheological properties of the fluid product over time by calculate the amount of added water and/or added admixtures required to, when mixed with the fluid product with known composition, modify the expected variations of the rheological properties of the fluid product over time to match with the detected variations of the rheological properties of the fluid product over time.

15. System for the contactless assessment of rheological properties of cement-based fluid products, comprising:

a mixer drum configured to rotate about an inclined axis and mounted on a truck with an opening and including a set of helicoidal mixing blades attached to an interior of the mixer drum, and a device associated with the mixing blades and configured to obtain first data related to a displacement speed of a set of mixing blades contained in the mixer drum during at least one period of time;

at least one image acquisition device focused towards the interior of the mixer drum and configured to obtain at least one image sequence of a fluid product contained within the mixer drum during the at least one period of time; and at least one computing unit that features at least one processor configured to:

execute a first algorithm configured to perform a first analysis that comprises determining a plurality of first parameters related to variations of the displacement speed of the set of mixing blades over time;

execute a second algorithm configured to perform a second analysis that comprises determining a second parameters related to a variation of a local displacement direction and speed of a surface of a fluid product contained in the mixer drum over time by analyzing the at least one image sequence identifying particles, and/or groups of particles of the surface of the fluid product and a displacement direction and speed thereof during the at least one period of time, indicative of a local displacement direction and speed of the surface of the fluid product, detecting variation in the local displacement direction and speed of the surface of the fluid product obtained from the analysis of the at least one image sequence;

execute a second algorithm configured to perform a second analysis that comprises calculating at least one rheological property parameter of the fluid product by detecting and measuring a temporal correlation between each first parameter, representing a variation of the displacement speed of the set of mixing blades, and one of the second parameters, representing a variation of the local displacement direction and speed of the surface of the fluid product contained in the mixer drum, occurring following the corresponding first parameter; and calculating, based on the detected temporal correlations, at least one of the rheological property parameters of the fluid product.

16. The system according to claim 15, wherein the opening of the mixed drum is concentric to the inclined axis of rotation thereof, and the image acquisition device is located outside of the mixer drum facing the opening.

17. The system according to claim 16, wherein the system comprises a user interface, located in the truck's cabin, in communication with the aforementioned at least one computing unit to display at least some of the results of the calculations performed as a part of the method implemented by the at least one computing unit, wherein the computation unit is internal to the truck or is at least partially external to the truck in wireless communications with the rest of the system.

18. The system according to claim 17, wherein the system comprises, moreover, additional mixer drums associated to additional image acquisition devices.

19. The system according to claim 15, wherein the image acquisition device comprises one or more video cameras, and/or one or more infrared video cameras, and/or at one or more laser detection and location sensors (LIDAR).

20. A non-transitory computer-readable storage medium storing code instructions that, when executed by a computation device, cause the computer device to perform a method comprising:

determining a plurality of first parameters, in a first analysis, related to variations of the displacement speed along time of the set of helicoidal mixing blades attached to the interior of a mixer drum rotative around an inclined axis and mounted on a truck, by implementing, in a computer processing unit, a first algorithm;

determining a plurality of second parameters, in a second analysis, related to variations of a local displacement direction and speed along time of a surface of a fluid product contained in the mixer drum by implementing, in a computer processing unit, a second algorithm that:

analyzes the at least one image sequence identifying particles, and/or groups of particles of the surface of the fluid product and a displacement direction and speed thereof during the at least one period of time, indicative of a local displacement direction and speed of the surface of the fluid product;

detects variation in the local displacement direction and speed of the surface of the fluid product obtained from the analysis of the at least one image sequence;

calculating, in a third analysis, at least one rheological property parameter of the fluid product by implementing, in a computer processing unit, a third algorithm that:

detects and measures a temporal correlation existing between each first parameter, representing a variation of the displacement speed of the set of mixing blades, and one of the second parameters, representing a variation of the local displacement direction and speed of the surface of the fluid product, occurring following the corresponding first parameter; and calculates, based on the detected temporal correlations, at least one of the rheological property parameters of the fluid product.

* * * * *